United States Patent

Halik

[15] 3,655,401
[45] Apr. 11, 1972

[54] PASTA PROCESS AND PRODUCTS

[72] Inventor: Joseph John Halik, Ossining, N.Y.

[73] Assignee: General Foods Corporation, White Plains, N.Y.

[22] Filed: July 28, 1969

[21] Appl. No.: 845,484

[52] U.S. Cl. ................................................99/85, 99/150 R
[51] Int. Cl. .............................................................A23l 1/16
[58] Field of Search...........................................99/85, 150 R

[56] References Cited

UNITED STATES PATENTS 3,352,686   11/1967   Mancuso et al.............................99/85

*Primary Examiner*—Raymond N. Jones
*Assistant Examiner*—James R. Hoffman
*Attorney*—Thomas V. Sullivan, Bruno P. Struzzi and Jerome J. Norris

[57] ABSTRACT

Process of producing shelf stable dehydrated rehydratable pasta products having greater than usual moisture contents, by cooking said pasta products in a solution comprising polyhydric alcohols salts, and an antimycotic.

6 Claims, No Drawings

PASTA PROCESS AND PRODUCTS

BACKGROUND OF THE INVENTION

This invention relates to a new and improved process for cooking farinaceous materials. More particularly, the invention is concerned with a new and improved process for heat treatment of pasta products under conditions which convert the product into an edible form while collaterally stabilizing said product against microorganic decomposition.

Food products such as pasta products have heretofore been cooked, primarily in an excess of water, whereupon the food undergoes an enzymatic inactivation, and upon further heat treatment the product is softened or otherwise further altered physically or chemically; such alteration, in the case of starch containing foods is commonly termed gelatinization. Significantly, such cooking processes do not promote any material changes in the microorganic stability of the foodstuff per se, and storage and packaging other than by commercial sterilization (canning) techniques cannot be utilized. However, in the case of vegetables, commercial canning procedures may require prolonged heating to kill spores of anaerobic bacteria and such prolonged heating can produce undesirable loss of flavor and/or texture.

The primary object of the invention is to treat pasta products under conditions which produce partially dried intermediate moisture pasta products having a moisture content higher than currently marketed quick-cooking pasta products, and capable of rehydrating to a texture close to that of cooked pasta products.

A further object of the invention is to treat pasta products under conditions which lend a more moist eating quality thereto, and yet essentially produces a product stable against microorganic decomposition, such that the need for any further treatment to provide bacteriostasis and protection against development of yeasts and/or molds is avoided.

A yet further object of the invention is to produce a partially dried intermediate moisture pasta which is capable of rehydration upon soaking in excess cold or hot water for at least 5 minutes; after which the excess water is poured off.

The term "farinaceous" refers to materials prepared from hard wheat flours, such as U.S. No. 1 semolina, durum granular, and other flours milled from amber and durum wheat, and blends thereof.

In general, the quick-cooking dehydrated rehydratable pasta products presently on the market will contain about 9 to 10 percent moisture, however, these products tend to be too dry and friable and require considerable time to effect rehydration to produce the "al dente" texture of conventionally cooked pasta products.

Briefly stated, the present invention eliminates the disadvantages attendant to quick-cooking pasta products in current use, by preparing a shelf stable dehydrated rehydratable intermediate moisture pasta product. The concept of intermediate moisture food products is set forth in U.S. Pat. No. 3,202,514; these products usually have a moisture content in excess of 10 percent and substantially below 75 percent. In general, any significant elevation of the moisture level of many foods above 10 percent will increase their palatability, however, such an increase tends to lead to microbiological decomposition unless the food products are packaged in a hermetically sealed container and commercially sterilized or maintained in a frozen or refrigerated state throughout the period of distribution and storage by the consumer.

One method of preventing microbiological decomposition in foods having moisture in excess of 10 percent is by utilizing the principal of limiting the amount of unbound water capable of supporting microbiological spoilage. This principle is disclosed in U.S. Pat. No. 3,202,514, and is known as the Aw, or the ability of the soluble solids in the food to limit the amount of "free" water available to bacteria; the bacteria's inability to survive this condition; and the subsequent shelf stability or product stability obtained by virtue of this condition.

Since shelf or product stability is the result of having substantially totally inhibited harmful mold as well as bacteriological growth, it has been necessary to incorporate antimycotics such as potassium sorbate in intermediate moisture foods to prevent mold development and ultimate shelf instability.

SUMMARY OF THE INVENTION

It has been found that shelf stable dehydrated rehydratable partially dried intermediate moisture pasta containing about 35 to 40 percent moisture, may be prepared by parboiling the pasta product in boiling water; draining the excess water therefrom, and cooking the parboiled pasta product by immersing said product in an excess boiling infusion solution comprising a polyhydric alcohol and an antimycotic.

Subsequent to said cooking step, the pasta product is cooled and refrigerated in said solution; thereafter the solution is drained off and the cooked pasta products is permitted to surface dry to a high moisture (35 to 40 percent), shelf stable form which is resistant to bacteriological and mold growth. The relative concentration of polyhydric alcohol utilized in the boiling infusion solution employed in accordance with the invention will generally range upwards from around 45 percent thereby enabling the amount of polyhydric alcohol in the final intermediate moisture pasta to be at least 25 percent. In addition to polyhydric alcohols, the boiling infusion solution will contain other stabilizing solutes, which will include salts in amounts of about one-eighths percent by weight based on the polyhydric alcohol. Generally, the boiling infusion solution will contain glycerol as the preferred polyhydric alcohol, and treatment of the parboiled pasta product in the infusion solution will be for a period of time sufficient to thermally deactivate any latent enzymatic and pathogenic activity. The stabilizing infusion solution of the invention is employed in an excess amount to immersion cook the pasta and cause it to undergo a water substitution by the stabilizing solution, such that the polyhydric alcohols and salt will replace a part of the percent by weight of the moisture which has been absorbed in the parboiled pasta product. The relative concentration of the polyhydric alcohols and salt used in accordance with the invention will largely be determined by the flavor requirement for the pasta product being so treated after removal of the water during the rehydration step. Thus, if the percent of polyhydric alcohols in the shelf stable dehydrated rehydratable pasta product is too high, a sweet taste will reside after the rehydration step of cold or hot soaking and pouring off the excess water. Similarly, taste and flavor considerations will also govern the upper feasible limits of salt permissible in the final pasta product.

The infusion process of the invention essentially results in dehydration, wherein a part of the moisture absorbed in the parboiled pasta product is partially substituted for by polyhydric alcohol and salt solutes in sufficient concentration to substantially increase the osmotic pressure of the resulting solution infused into the final pasta product.

Treatment by the stabilizing infusing solution will preferably involve initial "cook" wherein such solution will be elevated in temperature above 160° F. and the parboiled pasta product immersed therein for at least 6 minutes and preferably for a more prolonged period for about 8 minutes, until the degree of cooking or heat treatment produce the required softening or microorganic inactivation.

The rate of infusion will be determined by the concentration of polyhydric alcohols and salt solutes in the stabilizing solution, the higher the concentrations of the solutes the greater the rate of infusion thereof, and accordingly the less the period required to effect substitution of water in the pasta product by polyhydric alcohols and salt.

The process will find its broadest application with the treatment of parboiled pasta products and contemplates treating said pasta to enable packaging aerobically, i.e., packing under less than commercial sterilization conditions.

The expression "polyhydric alcohol" refers to alcohols with two or more hydroxyl groups, most typically such alcohols as glycerol, propylene glycol, sorbitol, mannitol, and mixtures thereof. However, the expression "contemplated in this invention" will also include a variety of sugar alcohols which may be classed by the number of hydroxyl groups and the general formula HOCH (CHOH) nCHCH, where $n$ has values from 2 to 5 like tetritols, penitols, hexitols, heptitols, etc., as well as stereoisomers thereof. In general these polyols are water-soluble, crystalline compounds with small optical rotations in water and have a slightly sweet to a very sweet taste. The polyhydric alcohols should be of a low molecular weight so as to offer a substantial effect in increasing the osmotic pressure of the stabilizing solution contained in the intermediate moisture pasta product.

It is a feature of the present invention that the cooking step utilizing the stabilizing infusion solution is conducted in an excess of said solution, whereupon the weight level of solution to parboiled pasta product will range from 2:1 to 10:1 and above; the stabilizing solution constituting a major percent by weight of polyhydric alcohols, and minor remaining percentages of water, salt, and an antimycotic. The principal objective is to effect dilution of the moisture which is absorbed into the pasta product during cooking, through partial substitution therefor by polyhydric alcohols and salt in a period of time commensurate with that degree of heat treatment or cooking required to produce the chemical and physical changes attendant to conventionally cooked pasta, and yet, following surface drying at ambient temperature preparatory to rehydration for eventual eating, the dehydrated shelf stable pasta product will be higher in moisture content than quick-cooking pastas and will lack the dry friable qualities of these pastas.

Polyhydric alcohols used will be employed at a level in solution so that, after completion of the infusion treatment and surface drying step, the dehydrated rehydratable intermediate moisture pasta product will have at least 25 percent polyhydric alcohol; which to an extent is established by the level of salt solute in the cooking solution. As the level of salt in the cooking solution increases, the level of polyhydric alcohol that might otherwise be employed therein, will be reduced.

It has been found that in order to obtain a shelf stable dehydrated rehydratable pasta product of 35 to 40 percent moisture, which will not be too sweet or salty upon rehydration, the amounts of polyhydric alcohol and salt contained in the stabilizing cook solution must be such as to give rise to a rehydratable pasta product having at least 25 percent polyhydric alcohol and at least 3 percent salt solubles. The corresponding cook solution necessary for production of proper tasting shelf stable rehydratable pasta will usually contain little more than at least 45 percent of polyhydric alcohol, and at least 6 percent salt.

The preferred way to treat the pasta products intended for the cook infusion solution is to parboil the dry pasta in water at temperatures in excess of 160° F. for at least 6 minutes, to a moisture content of 58 – 65 percent; draining the pasta and then subjecting the parboiled product to excess stabilizing cook solution above 160° F. for a time ranging between 6 to 8 minutes, so that any latent enzyme activity or microorganic instability precursors will be inactivated. Since the level of additives in the infusion is high, adequate hydration of the starch in the pasta is achieved as a result of this infusion process. After cooking and draining, the pasta product is permitted to surface dry at ambient temperatures for about 2 minutes to provide a product having water activity ranging from about 0.80 to 0.85.

Pasta products stabilized by the present invention will generally be of at least two types. The first type will be products intended for consumption after rehydrating in hot water to enhance the acceptability of the product in terms of flavor and texture. The second type of pasta products are those which are intended to be mixed with vegetables, such as onions, green peppers and olive pieces after rehydration in excess cold water, to form salads.

Preferred salts which may be used in the invention will be readily ionizable low molecular weight compounds which increase the osmotic pressure of the stabilizing infusion solution, such that the solution has a significant increase in ability to provide bacteriostasis and microorganic stability. Typical salts of use in accordance with the invention are: sodium chloride, calcium chloride, sodium phosphate, trisodium citrate and like inorganic and organic acid salts commonly used in foodstuffs, and mixtures thereof. Other salts of higher molecular weight which are less readily ionizable may be employed, however, with generally lesser effect in so far as bacteriostasis and microorganic stability are concerned.

The following examples will more specifically set forth the preferred embodiment of the invention:

EXAMPLE I

Two hundred parts of macaroni solids is parboiled* (*It is to be understood that the term parboiled means partially cooking in this invention.) in excess boiling water and simmered for about 8 minutes and drained. The resulting moisture in the macaroni product was about 58 percent. The parboiled product is immersed in 400 parts of boiling infusion solution and boiled at about 212° F. for about 8 minutes. Next, the macaroni is cooled and refrigerated in the immersion solution and permitted to surface dry on absorbent paper for about 2 minutes subsequent to draining-off the solution to obtain a partially dried shelf stable intermediate moisture macaroni product having a moisture content ranging from about 35 to 40 percent and water activity ranging from 0.80 to 0.85. Upon equilibrating for approximately one day, the final product followed.

| Ingredients | Solution(%) | Final Product(%) |
|---|---|---|
| Macaroni Solids | — | 28.0 |
| Water | 35.8 | 37.0* |
| Sodium Chloride | 6.6 | 3.6 |
| Glycerol | 53.4 | 29.2 |
| Propylene Glycol | 3.6 | 1.9 |
| Potassium Sorbate | 0.6 | 0.3 |
| Totals: | 100.0 | 100.0 |

*Actual percent moistures varied from 35 to 40 percent, water activities ranged from 0.80 to 0.85 indicating microbiological stability at room condition storage without aseptic packaging.

Bacteriological results conducted on a portion of the sample after storage are shown below:

| Sample | Aw | SPC* | Molds | Yeast |
|---|---|---|---|---|
| Zero time | 0.85 | 100 | <10 | <10 |
| 3 weeks at 100°F | 0.85 | <10 | <10 | <10 |

*Standard Plate Count

These results indicate that products up to an Aw of 0.85 are still microbiologically stable.

The shelf stable rehydratable dehydrated macaroni was rehydrated by soaking in excess water at temperatures in excess of 160° F. for at least 5 minutes and the excess water was poured-off to provide a good tasting macaroni product having an appearance much like that of conventionally cooked macaroni.

EXAMPLE II

Two hundred parts of spaghetti solids is parboiled in excess boiling water and simmered for about 8 minutes and drained. The resulting moisture in the spaghetti product was about 60 percent. The parboiled product is immersed in 400 parts of boiling infusion solution and boiled at about 212° F. for about 6 minutes. Next, the spaghetti is cooled and refrigerated in the immersion solution and permitted to surface dry on absorbent paper for about 2 minutes subsequent to draining-off the solution to obtain a partially dried shelf stable intermediate moisture spaghetti product having a moisture content ranging from about 35 to 40 percent and water activity ranging from 0.80 to 0.85. Upon equilibrating for approximately one day, the final product followed.

| Ingredients | Solution(%) | Final Product(%) |
|---|---|---|
| Spaghetti Solids | — | 24.6 |
| Water | 42.1 | 38.8 |
| Sodium Chloride | 6.0 | 3.8 |
| Glycerol | 48.2 | 30.5 |
| Propylene Glycol | 3.2 | 2.0 |
| Potassium Sorbate | 0.5 | 0.3 |
| Totals: | 100.0 | 100.0 |

Bacteriological results conducted on a portion of the sample after storage are shown below:

| Sample | Aw | SPC* | Molds | Yeast |
|---|---|---|---|---|
| Zero Time | 0.83 | 10 | <10 | <10 |
| 3 Weeks at 100°F | 0.83 | <10 | <10 | <10 |

*Standard Plate Count

These results indicate that products up to an Aw of 0.85 are still microbiologically stable.

The shelf stable rehydratable dehydrated spaghetti was rehydrated by soaking in excess water at temperatures in excess of 160° F. for at least 5 minutes and the excess water was poured-off to provide a good tasting spaghetti product having an appearance much like that of conventionally cooked spaghetti.

EXAMPLE III

Two hundred parts of noodle solids is parboiled in excess boiling water and simmered for about 3 minutes and drained. The resulting moisture in the noodle product was about 60 percent. The parboiled product is immersed in 400 parts of boiling infusion solution and boiled at about 212° F. for about 6 minutes. Next, the noodles are cooled and refrigerated in the immersion solution for 4 hours and permitted to surface dry on absorbent paper for about 2 minutes subsequent to draining-off the solution to obtain a partially dried shelf stable intermediate moisture noodle product having a moisture content ranging from about 35 to 40 percent and water activity ranging from 0.80 to 0.85. Upon equilibrating for approximately one day, the final product followed.

| Ingredients | Solution(%) | Final Product(%) |
|---|---|---|
| Noodle Solids | — | 30.4 |
| Water | 41.0 | 38.0 |
| Sodium Chloride | 6.1 | 3.3 |
| Glycerol | 49.0 | 26.2 |
| Propylene Glycol | 0.5 | 1.8 Potassium Sorbate |
| Totals: | 100.0 | 100.0 |

The shelf stable rehydratable dehydrated noodles were rehydrated by soaking in excess water at temperatures in excess of 160° F. for at least 5 minutes and the excess water was poured-off to provide a good tasting noodle product having an appearance much like that of conventionally cooked noodles.

While a specific formulation and procedure have been given for the preparation of partially dried intermediate moisture pasta, it can be seen that variations in formulas and procedures as well as starting materials are possible. For example, the cooking time will vary with the type of pasta used. Optimum cooking time will be that which thoroughly cooks the particular pasta without cooking.

The concentrations of the ingredients in the infusion solution will depend mainly on the final moisture in the product and also to some extent on the final Aw desired as well as the level of antimycotics.

It has been found that rapid bacteriological spoilage will take place at Aw's above 0.88. Below that level, growth is generally inhibited, but there may be occasional organisms that will grow at Aw's below 0.88. Whether there are such organisms in pasta and whether they will grow in pasta would have to be determined. In general, Aw's in the range of 0.80 to 0.85 are safe based on the tests conducted.

Another important factor for microbiological stability, especially mold and yeast inhibition, is the type and amounts of antimycotics used in the pasta. The formula given uses about 2.0 percent propylene glycol and about 0.3 percent potassium sorbate as the antimycotic system. These levels have been found to be effective in the intermediate moisture pasta products. However, lower levels would also be effective.

What is claimed is:

1. A process for producing shelf stable dehydrated rehydratable pasta products having a moisture content between about 35 to 40 percent, comprising parboiling the pasta in excess boiling water for at least 3 minutes, draining off said excess water, immersion cooking the pasta above 160° F. in a stabilizing solution for a period sufficient to thermally inactivate enzymatic and pathogenic activity of the pasta, cooling the solution, and surface drying the pasta; said stabilizing solution containing in excess of about 45 percent polyhydric alcohol, at least 6 percent salt, and sufficient antimycotic to prevent mold growth.

2. The process of claim 1 wherein the parboiled pasta is immersion cooked in the solution at a temperature in excess of 160° F. for a period in excess of 5 minutes.

3. The process of claim 1 wherein the salt present in the solution is selected from the class of readily ionizable salts.

4. The process of claim 1 wherein the pasta treated is macaroni.

5. The process of claim 1 wherein the stabilizing solution is removed from the cooked pasta product subsequent to cooling and permitted to surface dry on absorbent paper for about 2 minutes.

6. The shelf stable dehydrated rehydratable pasta product produced by the process of claim 1.

* * * * *

UNITED STATES PATENT OFFICE
CERTIFICATE OF CORRECTION

Patent No. 3,655,401    Dated Apr. 11, 1972

Inventor(s) Joseph John Halik

It is certified that error appears in the above-identified patent and that said Letters Patent are hereby corrected as shown below:

Title page, in the ABSTRACT, Line 4 after "alcohols" and before "salts" insert ---,---.

In Column 5, starting at Line 40 change the table to read:

| Ingredients | Solution (%) | Final Product (%) |
|---|---|---|
| Noodle Solids | – | 30.4 |
| Water | 41.0 | 38.0 |
| Sodium Chloride | 6.1 | 3.3 |
| Glycerol | 49.0 | 26.2 |
| Propylene Glycol | 3.4 | 1.8 |
| Potassium Sorbate | 0.5 | 0.3 |
| Totals: | 100.0 | 100.0 |

Signed and sealed this 24th day of April 1973.

(SEAL)
Attest:

EDWARD M. FLETCHER, JR.
Attesting Officer

ROBERT GOTTSCHALK
Commissioner of Patents